(12) United States Patent
Lee et al.

(10) Patent No.: US 9,730,131 B2
(45) Date of Patent: Aug. 8, 2017

(54) METHOD AND SYSTEM FOR MANAGING HANDOVER IN RADIO ACCESS NETWORKS

(75) Inventors: Dong Hee Lee, Yongin-si (KR); Tae Sun Yeoum, Seoul-si (KR); Paisal Vaishali, Bangalore (IN)

(73) Assignee: Samsung Electronics Co., Ltd (KR)

( * ) Notice: Subject to any disclaimer, the term of this patent is extended or adjusted under 35 U.S.C. 154(b) by 386 days.

(21) Appl. No.: 12/999,559

(22) PCT Filed: Jun. 16, 2009

(86) PCT No.: PCT/KR2009/003202
§ 371 (c)(1),
(2), (4) Date: Dec. 16, 2010

(87) PCT Pub. No.: WO2010/005180
PCT Pub. Date: Jan. 14, 2010

(65) Prior Publication Data
US 2011/0090873 A1    Apr. 21, 2011

(30) Foreign Application Priority Data

Jun. 16, 2008  (IN) ............................ 1460/CHE/2008

(51) Int. Cl.
*H04W 4/00*     (2009.01)
*H04W 36/30*    (2009.01)
(Continued)

(52) U.S. Cl.
CPC ....... *H04W 36/30* (2013.01); *H04W 36/0022* (2013.01); *H04W 36/0066* (2013.01);
(Continued)

(58) Field of Classification Search
CPC .................................................. H04W 36/00
(Continued)

(56) References Cited

U.S. PATENT DOCUMENTS 6,507,567 B1 *  1/2003  Willars ........................ 370/321
6,975,881 B2   12/2005  Sheynman et al.
(Continued)

FOREIGN PATENT DOCUMENTS

CN        1582053      2/2005
CN      101176375      5/2008
(Continued)

OTHER PUBLICATIONS

3GPP TS 23.216 V8.0.0 Dated: Jun. 9, 2008 3rd Generation Partnership Project; Technical Specification Group Services and System Aspects; Single Radio Voice Call Continuity (SRVCC); Stage 2 (Release 8) Global System for Mobile Communications hereafter 3GPP TS 23.216 V8.0.0.*

(Continued)

*Primary Examiner* — Gregory Sefcheck
*Assistant Examiner* — Jael Ulysse
(74) *Attorney, Agent, or Firm* — The Farrell Law Firm, P.C.

(57) ABSTRACT

A method and system for managing handover from a first radio access network to second radio access network is provided. The method includes receiving information associated with one or more neighboring cells from a User Equipment (UE). The information associated with the one or more neighboring cell is measurement reports. Thereafter, the method deciding to perform Handover (HO) based on the measurement reports for the UE from the first radio access network to the second radio access network. Further, the method identifies a target cell from the one or more neighboring cells. The method then determines target cell capabilities. Thereby, the method sends at least one of a handover required message and a relocation required message along with the target cell capabilities to a core network element. The core network element then manages voice (Continued)

bearers and non-voice bearers based on the target cell capabilities.

16 Claims, 5 Drawing Sheets

(51) Int. Cl.
    *H04W 36/00*       (2009.01)
    *H04W 36/14*       (2009.01)
    *H04W 80/04*       (2009.01)

(52) U.S. Cl.
    CPC ...... *H04W 36/005* (2013.01); *H04W 36/0083* (2013.01); *H04W 36/14* (2013.01); *H04W 80/04* (2013.01)

(58) Field of Classification Search
    USPC ....... 370/321, 328, 329, 331, 332, 352, 493; 455/436, 522
    See application file for complete search history.

(56) References Cited

U.S. PATENT DOCUMENTS

| | | | |
|---|---|---|---|
| 8,107,433 B2* | 1/2012 | Jokinen | 370/331 |
| 8,243,894 B2* | 8/2012 | Katis et al. | 379/93.01 |
| 8,289,954 B2* | 10/2012 | Tenny et al. | 370/352 |
| 2002/0085516 A1* | 7/2002 | Bridgelall | H04W 36/04 370/329 |
| 2003/0169725 A1* | 9/2003 | Ahmavaara | H04W 36/0022 370/352 |
| 2004/0184439 A1* | 9/2004 | Blanc | H04W 36/0066 370/349 |
| 2005/0021586 A1* | 1/2005 | Bichot | H04W 48/18 709/200 |
| 2005/0037757 A1* | 2/2005 | Moon | H04W 36/0072 455/436 |
| 2005/0163106 A1* | 7/2005 | Vaittinen | H04W 76/064 370/352 |
| 2005/0261017 A1* | 11/2005 | Vaittinen et al. | 455/522 |
| 2006/0209798 A1* | 9/2006 | Oikarinen | H04L 41/06 370/352 |
| 2006/0246906 A1* | 11/2006 | Vaittinen | H04W 36/14 455/442 |
| 2007/0010252 A1* | 1/2007 | Balachandran | H04W 36/0033 455/437 |
| 2007/0081497 A1* | 4/2007 | Drevon | H04W 36/26 370/331 |
| 2007/0133465 A1* | 6/2007 | Promenzio | H04L 29/06027 370/331 |
| 2007/0165574 A1* | 7/2007 | Srey | H04W 36/02 370/331 |
| 2007/0218911 A1* | 9/2007 | Islam | H04W 60/04 455/445 |
| 2007/0248079 A1* | 10/2007 | Jayaram et al. | 370/352 |
| 2008/0056198 A1* | 3/2008 | Charpentier et al. | 370/332 |
| 2008/0089293 A1* | 4/2008 | Madour et al. | 370/331 |
| 2008/0095119 A1* | 4/2008 | Bachmann | H04W 28/16 370/332 |
| 2008/0101292 A1* | 5/2008 | Sengupta et al. | 370/331 |
| 2008/0192697 A1* | 8/2008 | Shaheen | 370/331 |
| 2008/0267128 A1* | 10/2008 | Bennett | H04W 36/0022 370/331 |
| 2008/0273524 A1* | 11/2008 | Tenny et al. | 370/352 |
| 2008/0316972 A1* | 12/2008 | Shaheen | H04W 36/0033 370/331 |
| 2009/0036130 A1* | 2/2009 | Diachina | H04W 36/0022 455/436 |
| 2009/0213809 A1* | 8/2009 | Kwon et al. | 370/331 |
| 2009/0270099 A1* | 10/2009 | Gallagher | H04W 8/08 455/435.1 |
| 2010/0054209 A1* | 3/2010 | Mahdi | 370/331 |
| 2010/0260105 A1* | 10/2010 | Keller et al. | 370/328 |
| 2010/0290433 A1* | 11/2010 | Stojanovski et al. | 370/331 |
| 2010/0309886 A1* | 12/2010 | Vikberg et al. | 370/332 |
| 2011/0013597 A1* | 1/2011 | Hwang et al. | 370/331 |
| 2011/0051691 A1* | 3/2011 | Hietalahti et al. | 370/331 |
| 2011/0110326 A1* | 5/2011 | Rexhepi et al. | 370/331 |
| 2012/0064897 A1* | 3/2012 | Amirijoo et al. | 455/436 |

FOREIGN PATENT DOCUMENTS

| | | |
|---|---|---|
| CN | 101999244 | 3/2011 |
| KR | 1020000031359 | 6/2000 |
| KR | 1020060118642 | 11/2006 |
| RU | 2006 109 487 | 7/2006 |
| WO | WO 2006/114120 | 11/2006 |
| WO | WO 2007/144027 | 12/2007 |
| WO | WO 2007/144029 | 12/2007 |
| WO | WO 2008/023162 | 2/2008 |

OTHER PUBLICATIONS

3GPP TS 23.216 V8.0.0 Dated: Jun. 9, 2008 3rd Generation Partnership Project; Technical Specification Group Services and System Aspects; Single Radio Voice Call Continuity (SRVCC); Stage 2 (Release 8) Global System for Mobile Communications.*
PCT/ISA/237 Written Opinion issued on PCT/KR2009/003202 (11 pages).
3rd Generation Partnership Project; Technical Specification Group Services and Systems Aspects; Single Radio Voice Call Continuity (SRVCC); Stage 2, (Release 8), 3GPP TS 23.216 V2.0.0, Jun. 2008.
3rd Generation Partnership Project; Technical Specification Group Services and System Aspects; General Packet Radio Service (GPRS) Enhancements for Evolved Universal Terrestrial Radio Access Network (E-UTRAN) Access (Release 8), 3GPP TS 23.401 V8.1.0, Mar. 2008.
Nokia Siemens Networks, Nokia, "SRVCC Target Cell Selection Handling with Indication from E-UTRAN", 3GPP TSG SA WG2 Meeting #65, TD S2-083747, May 16, 2008.
Huawei, "Proposal for an Enhanced SRV Solution D Using DTM Handover", 3GPP TSG SA WG2 Architecture—S2#57, S2-071703, Apr. 27, 2007.
Nortel, Motorola, "Call Flows for SRVCC from EUTRAN to GERAN/UTRAN", TD S2-082946, 3GPP TSG SA WG2 Meeting #64, Apr. 7-11, 2008.
Nortel et al., "D/F Update", TD S2-081651, 3GPP TSG SA WG2 Meeting #63, Feb. 18-22, 2008.
3rd Generation Partnership Project; Technical Specification Group Services and Systems Aspects; Single Radio Voice Call Continuity (SRVCC); Stage 2, (Release 8), 3GPP TS 23.216 V1.1.0, Apr. 2008.
3rd Generation Partnership Project; Technical Specification Group Services and Architecture; Feasibility Study on Multimedia Session Continuity; Stage 2 (Release 8), 3GPP TR 23.893 V2.0.0, XP050364174, Jun. 6, 2008, 63 pages.
European Search Report dated Jul. 28, 2016 issued in counterpart application No. 09794586.9-1854, 12 pages.

* cited by examiner

Fig. 6

METHOD AND SYSTEM FOR MANAGING HANDOVER IN RADIO ACCESS NETWORKS

PRIORITY

This application claims priority under 35 U.S.C. §119(a) to an Indian Patent Application filed on Jun. 16, 2008, assigned Serial No. 1460/CHE/2008, to an Indian Patent Application filed on Jun. 11, 2009, assigned Serial No. 1460/CHE/2009, and to PCT/KR2009/003202 filed Jun. 16, 2009, the disclosure of each of which is hereby incorporated by reference.

TECHNICAL FIELD

The present invention relates to managing communication in Radio Access Network (RAN). More particularly the present invention relates to managing Handover (HO) in a plurality of radio access networks.

BACKGROUND ART

Today, several generations of radio communication systems have evolved in the world. The several generations of the radio communication systems includes first generation system (1G), second generation system (2G), third generation system (3G) and fourth generation system (4G). Each of the generations has different transmission characteristics and different communication technology.

The first generation system (1G), for example Advanced Mobile Phone System (AMPS), Total Access Communications System (TACS), is based on analog frequency modulation technology. Similarly, the second generation (2G) system, for example Global System for Mobile communications (GSM), is based on Time Division Multiple Access (TDMA). The third generation (3G) systems are based on a Wideband Code Division Multiple Access (WCDMA) air interface. Examples of a 3G system are Universal Mobile Telecommunication System (UMTS) and GSM Evolution (EDGE).

The fourth generation system (4G) is an ITU specification that is presently being developed for broadband mobile capabilities. The 4G system would enable Internet Packet (IP)-based voice data and streaming multimedia at higher speeds, compared to 3G. The radio communication system is also termed as Radio Access Networks (RAN). As the number of RANs is increasing, the geographical areas are also covered by one or more RANs. For example, at a given geographical area there may be two RANs that operate simultaneously, for example 2G and 3G systems. Similarly, there may be a geographical area where only one RAN is operating, for example only 3G.

Thus with an increase in the number of RANs, for example GSM, UMTS, Wireless Local Area Network (WLAN), and EDGE, interworking between different RANs and air interface standards has become a priority. Hence, to achieve efficient interworking between different RANs and to provide more network coverage to User Equipment (UE), handover procedures between RANs and communication network has become increasingly important. The Handover (HO) procedure is a technical procedure for switching an in-progress call from a coverage area of one base station (or one communication systems) to another base station (or another communication system) while ensuring the continuity of the in-progress call.

The HO in a communication system is when the UE moves from one radio cell supported by the communication system to another radio cell supported by the communication system. For example in 2G, moving from coverage area of one base station associated with one service provider to another base station supported by the same or different service providers. The HO between different RANs means an inter-technology handover, for example moving from a 3G network to a 4G network, and vise versa. The HO between different RANs is known as interlayer HO.

The different RANs have different characteristics and have different network structures that enable communication services for the UE. Hence, the HO procedures from one RAN to another RAN have to be managed efficiently. For example, voice bearers and non voice bearers that are associated with the UE in a first RAN can be supported through Packet Switched network and/or Circuit Switched network. Further, when the UE moves from the first RAN to a second RAN and HO procedure is initiated, and then there may be a case that the second RAN have different capabilities than the first RAN. Then the voice bearers and non-voice bearers associated with the UE have to be managed efficiently based on the capabilities of the second RAN.

Hence there exists a need to efficiently manage HO requests in Radio Access Network (RANs).

DISCLOSURE OF INVENTION

Technical Solution

In an embodiment, a method for managing handover from a first radio access network to a second radio access network is provided. The method is performed at a first network element of the first radio access network. The method includes receiving information associated with one or more neighboring cells from a User Equipment (UE). In an embodiment, the information associated with the one or more neighboring cell is measurement reports. The method then decides to perform Handover (HO) based on the measurement reports for the UE from the first radio access network to the second radio access network. The first radio access network is at least a Packet Switched (PS) network and the second radio access network is at least a Circuit Switched (CS) network. Further, the method identifies a target cell in the second radio access network from the one or more neighboring cells provided by the measurement reports. Thereafter, the method determines the target cell capabilities. Then the method sends at least one of a handover required message and a relocation required message along with the target cell capabilities to a core network element.

In another embodiment, a method for managing Handover (HO) from a first radio access network to a second radio access network is provided. The method is performed at a core network element. The method includes receiving at least one of a handover required message and a relocation required message along with target cell capabilities. The method then splits voice bearers and the non-voice bearers. Thereafter, the method manages HO for the voice bearers and the non-voice bearers based on the target cell capabilities.

In yet another embodiment, a method for managing Handover (HO) from a first radio access network to second radio access network is provided. The method is performed at a first network element of the first radio access network. The method includes receiving information associated with one or more neighboring cells from a User Equipment (UE).

In an embodiment, the information associated with the one or more neighboring cell is measurement reports. The method then decides to perform Handover (HO) based on the measurement reports for the UE from the first radio access network to the second radio access network. The first radio access network is at least a Packet Switched (PS) network and the second radio access network is at least a Circuit Switched (CS) network. Thereafter, the method identifies a target cell in the second radio access network from the one or more neighboring cells provided by the measurement reports. The method further determines the target cell capabilities. After, determining the target cell capabilities, the method determines a list of bearers for which HO is to be performed based on the target cell capabilities. Thereafter, the method sends the list of bearers to core network element for performing HO procedures for the list of bearers.

In still another embodiment, a method for managing Handover (HO) requests from a first radio access network to a second radio access network is provided. The method is performed at a core network element. The method includes maintaining capabilities of one or more cells in a database. The method then receives at least one of a HO required message and a relocation required message to perform HO for a User Equipment (UE) from the first radio access network to the second radio access network. At least one of the handover required message and the relocation required message includes information associated with a target cell. Further, the target cell capabilities are identified from capabilities of one or more cells that are maintained in the database. Thereafter, the method manages HO for voice bearers and non-voice bearers based on the target cell capabilities.

In still another embodiment, a first network element of a first radio access network is provided. The first network element includes a processor and a transceiver. The transceiver in the first network element receives information associated with one or more neighboring cells from a User Equipment (UE). In an embodiment, the information associated with the one or more neighboring cell is measurement reports associated with one or more neighboring cells and the UE. The processor in the first network element decides to perform Handover (HO) based on the measurement reports for the User Equipment (UE) from a first radio access network to a second radio access network. Further, the processor identifies a target cell in the second radio access network from one or more neighboring cells provided by the measurement reports. Furthermore, the processor determines the target cell capabilities. The transceiver also sends at least one of a handover required message and a relocation required message along with the target cell capabilities. In an embodiment, the transceiver sends a list of bearers along with at least one of a handover required message and a relocation required message.

In still another embodiment, a core network element is provided. The core network element includes a transceiver, and a processor. The transceiver in the core network element receives at least one of a handover required message and a relocation required message along with target cell capabilities. The processor in the core network element splits voice bearers and non-voice bearers. Further, the processor manages Handover (HO) for the voice bearers and the non-voice bearers based on the target cell capabilities.

In still another embodiment, a core network element is provided. The core network element includes a memory, a transceiver, and a processor. The memory in the core network element stores capabilities of one or more cells in a database. The transceiver receives at least one of a Handover (HO) required message and a relocation required message along with information associated with a target cell to perform HO from a first radio access network to a second radio access network. The processor then identifies capabilities associated with the target cell from the database. Further, the processor manages HO for voice bearers and non-voice bearers based on the target cell capabilities.

The features and advantages of the present invention will become more apparent from the ensuing detailed description of the invention taken in conjunction with the accompanying drawings.

BRIEF DESCRIPTION OF DRAWINGS

The accompanying figure, similar reference numerals may refer to identical or functionally similar elements. These reference numerals are used in the detailed description to illustrate various embodiments and to explain various aspects and advantages of the present disclosure.

Persons skilled in the art will appreciate that elements in the figure is illustrated for simplicity and clarity and may have not been drawn to scale. For example, the dimensions of some of the elements in the figure may be exaggerated relative to other elements to help to improve understanding of various embodiments of the present disclosure.

MODE FOR THE INVENTION

The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are no where intended to represent a chronological order, as and where stated otherwise. A set is defined as a non-empty set including at least one element.

Figure 1:
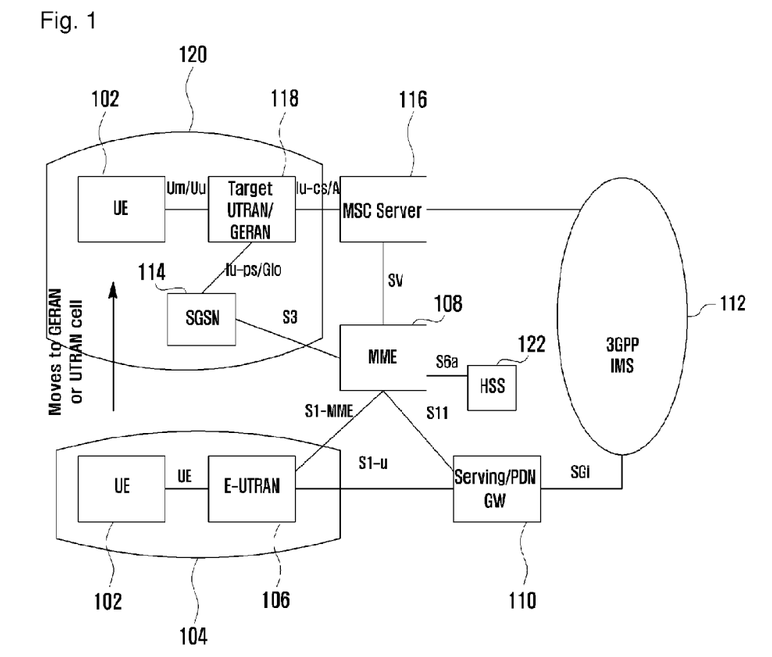
FIG. 1 illustrates an exemplary environment, where various embodiments of the present invention can be practiced.

FIG. 1 illustrates an exemplary environment 100, where various embodiments of the present invention can be practiced. The environment 100 includes two radio access networks for example, a UTRAN and an E-UTRAN network. Though the method in the environment 100 is explained using a 3G network and a 4G network, it no where limits the scope of the invention to 3G and 4G. Hence the method can be explained with the help of any other networks. Further, the environment 100 can also include more or less number of system elements to perform the method.

In an embodiment, the environment 100 represents a typical architecture for Single Radio Voice Call Continuity (SR-VCC) infrastructure. In the environment 100, a User Equipment (UE) 102 in a first radio access network 104 (also referred as Source cell) attaches to an E-UTRAN 106 using the E-UTRAN Uu interface. The E-UTRAN 106 consists of a plurality of eNodeB entities (Not shown in figure). The plurality of eNodeB entities are connected to the Mobile Management Entity (MME) 108 using S1-MME interface.

In an embodiment, when a user of the UE 102 initiates an IP multimedia subsystem (IMS) based voice call, then the voice call is anchored in application server (IMS) associated with SR-VCC continuity. In an embodiment, the data and signaling paths for the IMS based voice call uses the S1-U interface between E-UTRAN and Serving/PDN Gateway (GW) 110. Further a SGi interface is used between the Serving/PDN GW and IMS network entity 112.

In the environment 100, when a user of the UE 102 moves from one radio access network (for example a Source cell 104) to another radio access network (for example a Target cell 120) during an in-progress call a Handover (HO) is required. In an embodiment, when the UE 102 moves from the E-UTRAN network 104 to the GERAN/UTRAN network 120 during the in-progress voice call, then HO is required from the E-UTRAN network 104 to the UTRAN/GERAN network 120. The E-UTRAN supports only PS (Packet Switched) network and the GERAN/UTRAN supports PS and CS (Circuit Switched) network. Hence, the UE 102 moves from a PS network to a network that supports PS and CS network.

Therefore eNodeB in the E-UTRAN 106 detects that a Single radio voice call continuity Handover (HO) is required to be performed towards target GERAN/UTRAN network 120. Then, eNodeB sends a handover required message to MME 108 over S1-MME interface. In an embodiment, the MME 108 also receives target cell capabilities. For example, the MME 108 receives the capabilities associated with the target cell 120. For example, the capabilities of the target cell include capabilities of the URAN/GERAN network. For example, the target cell, in the environment 100, is a Packet Switched (PS) network and a Circuit Switched (CS) network.

The MME 108 then identifies the voice bearers and the non-voice bearers associated with the UE 102 while the HO procedure is in progress. The MME 108 then starts the handover of the voice bearers towards a CS domain of the target cell 120 by sending message over Sv interface to a Mobile Switching Center (MSC) Server 116. The MSC server 116 then triggers a session transfer of the IMS layer by sending session transfer request to the IMS application server.

The MME 108 then manages the non-voice bearers. In an embodiment, the MME 108 starts a PS-PS handover for the non-voice bearers when the target cell 120 supports both CS and PS network and also Dual Transfer Mode (DTM) handover. In another embodiment, the MME 108 suspends non-voice bearers when the target cell in the second radio access network support CS and PS network but does not support DTM. In yet another embodiment, the MME 108 deactivates the non-voice bearers when the target cell does not support PS network.

In an embodiment, for PS-PS handover of non-voice bearers the MME 108 sends a message to SGSN 114 over S3 interface. Once session transfer is initiated and the handover preparation is complete in the target cell 120, the MME 108 sends a HO command to the UE 102 via eNodeB. The UE 102 on receiving the HO command moves to target cell resources. Then the target cell 120 detects presence of the UE 102. In an embodiment, the UTRAN/GERAN 118 informs the target MSC server 116 via Iu-cs/A interface and the target SGSN 114 via Iu-ps/Gb interface about the HO. Further, the MSC server 116 and the SGSN 114 inform the MME 108 of handover completion via Sv and S3 interfaces respectively. Thereafter, the MME 108 releases resources reserved for the UE 102 on the source cell 104.

Figure 2:
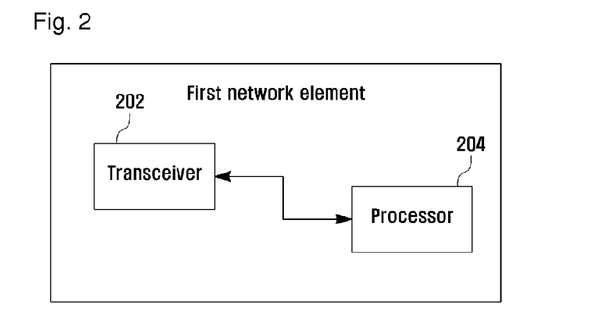
FIG. 2 illustrates a first network element of a first radio access network, in accordance with one embodiment of the present invention.

FIG. 2 illustrates a first network element of the first radio access network 200, in accordance with one embodiment of the present invention. To explain the first network element, references will be made to FIG. 1. However, it will be apparent to a person ordinarily skilled in the art that the present embodiment can be explained with the help of any other suitable embodiment of the present invention.

In an embodiment, the first network element is a node that enables communication devices, associated with fourth generation communication network, to communicate with other communication devices associated with any communication networks. In an embodiment, the first network element is an eNodeB that is used for establishing communication in E-UTRAN network.

In the environment 100, the first network element is associated with the User Equipment (UE), for example UE 102 which is associated with the E-UTRAN network 104. The first network element includes a transceiver 202 and a processor 204.

The transceiver 202 in the first network element receives, information associated with one or more neighboring cells from the UE. In an embodiment, the transceiver 202 also receives measurement reports associated with the one or more neighboring cells from the UE 102. In an embodiment, the measurement reports include signal strength and/or resources availability associated with the one or more neighboring cells.

The processor 204 in the first network element decides to perform Handover (HO) based on the measurement reports for the UE from a first radio access network to a second radio access network. For example, the processor 204 decides to perform Handover (HO) based on the measurement reports for the UE 102 from the first radio access network 104 to the second radio access network 120. The processor 204 then identifies a target cell from the one or more neighboring cells provided by the measurement reports.

In an embodiment, the one or more neighboring cells are one or more cells that are available to perform Handover procedures by the UE 102. Hence, the one or more neighboring cells are one or more cells that are available around the UE 102 when the UE 102 is moving out of a coverage area of the first radio access network 104. In an embodiment, the target cell is a cell that selected to perform HO procedures for the UE.

Further, the processor 204 determines the target cell capabilities. In an embodiment, the processor identifies a list of bearers for which HO is possible and a list of bearers for which HO is not possible based on the target cell capabilities. In an embodiment, the target cell capabilities are the network support capabilities of the target cell. For example, the target cell capabilities include information regarding whether the target cell supports only Circuit Switched (CS) network, both CS and Packet Switched (PS) UTRAN network, both CS and PS GERAN network with DTM support and DTM Handover support, both CS and PS GERAN network without DTM support but with PS Handover support or both CS and PS GERAN network without DTM and without PS handover support.

Thereafter, the transceiver 202 sends at least one of a handover required message and a relocation required message along with the target cell capabilities. In an embodiment, the transceiver sends the list of bearers for which the HO is possible. In an embodiment, the handover required message along with target cell capabilities is sent to a core network element. In another embodiment, the relocation required message along with the target cell capabilities is sent to the core network.

Figure 3:
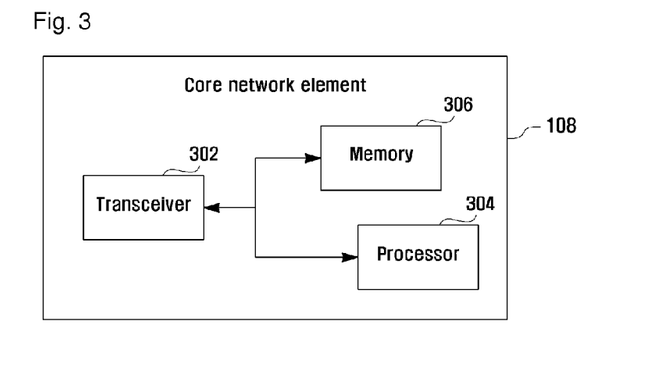
FIG. 3 illustrates a core network element, in accordance with one embodiment of the present invention.

FIG. 3 illustrates a core network element, in accordance with one embodiment of the present invention. To explain the core network element, references will be made to FIG. 1. However, it will be apparent to a person ordinarily skilled in the art that the present embodiment can be explained with the help of any other suitable embodiment of the present invention. In an embodiment, the core network element enables User Equipment (UE) to perform Handover (HO) procedures. In an embodiment, the core network element is a Mobile Management Entity (MME). In another embodiment, the core network element is a Serving General Packet Radio Service (GPRS) Support Node (SGSN). For example, in the environment 100, the core network element is MME 108 or SGSN 114.

The core network element includes a transceiver 302 and a processor 304. The transceiver 302 in the core network element receives at least one of a handover required message and a relocation required message along with target cell capabilities. In an embodiment, the handover required message along with the target cell capabilities is received from the first network element. In another embodiment, the relocation required message along with the target cell capabilities is received from the first network element. In the environment 100, the handover required message along with the target cell capabilities is received from the eNodeB associated with the E-UTRAN 106.

The processor 304 in the core network element splits voice bearers and non-voice bearers. In an embodiment, the non-voice bearers and the voice bearers are segregated from a list of bearers received from the first network element. Further, the processor 304 manages Handover (HO) for the voice bearers and the non-voice bearers based on the target cell capabilities.

In an embodiment, the core network element also includes a memory 306. The memory 306 in the core network element stores capabilities of one or more cells in a database. In an embodiment, the memory 306 is configured in the core network element. In another embodiment, the memory 306 is externally associated with the core network element. In an embodiment, the memory 306 is a volatile memory. In another embodiment, the memory 306 is a non-volatile memory. In the environment 100, the database in the memory 306 is associated in the Home Subscriber Server (HSS) 122.

In an embodiment, the transceiver 302 receives at least one of a handover required message and a relocation required message along with information associated with the target cell to perform HO from a first radio access network to a second radio access network. The processor 304 then identifies capabilities associated with the target cell from the database. For example, the processor 304 after receiving target cell information matches the target cell with the one or more cells registered in the memory 306. Thereafter, the processor 304 identifies the target cell capabilities from the capabilities stored in the memory 306. Further, the processor 304 manages HO for the voice bearers and the non-voice bearers based on the target cell capabilities stored in the memory 306.

Figure 4:
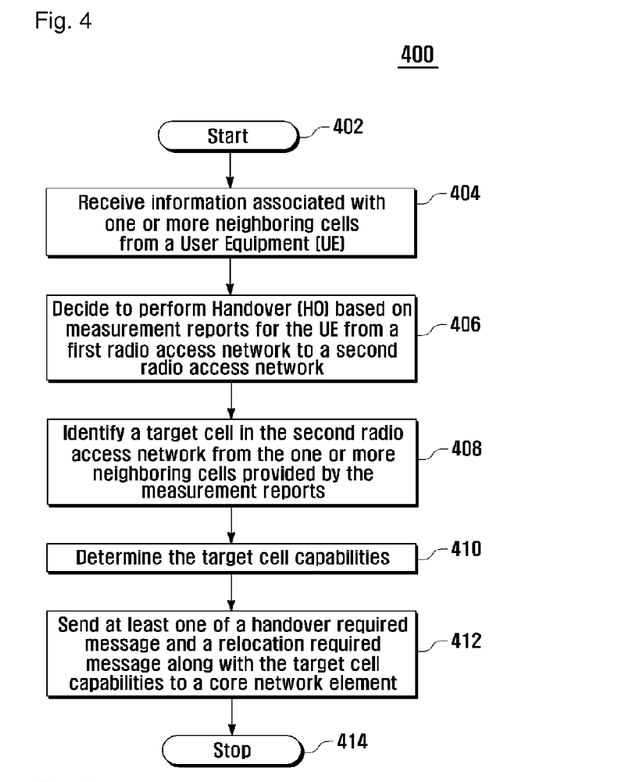
FIG. 4 illustrates a flow chart depicting a method for managing handover from a first radio access network to a second radio access network, in accordance with an embodiment of the present invention.

FIG. 4 illustrates a flow chart depicting a method for managing handover from a first radio access network to a second radio access network, in accordance with an embodiment of the present invention. In an embodiment, the method is performed by a first network element of the first radio access network. To explain the method 400, references will be made to FIG. 1. However, it will be apparent to a person ordinarily skilled in the art that the present embodiment can be explained with the help of any other suitable embodiment of the present invention. The method 400 can also include more or fewer number of steps as depicted in FIG. 4. Further, the order of the steps may also vary.

At step 402 the method 400 is initiated. In an embodiment, the method is initiated at first network element. In an embodiment, the first network element of the first radio access network is an eNodeB, a NodeB or a Radio Network Controller (RNC). An example of the first network element includes, but is not limited to, eNodeB, for example eNodeB in the E-UTRAN 106. At step 404, information associated with one or more neighboring cells is received from a User Equipment (UE). The information associated with the one or more neighboring cell is measurement reports. In an embodiment, the measurement reports include signal strength and resources availability associated with the one or more neighboring cells.

At step 406, the method decides to perform Handover (HO) based on the measurement reports for the UE from the first radio access network to the second radio access network. For example, the method decides to perform Handover (HO) based on the measurement reports for the UE 102 from the first radio access network 104 to the second radio access network 120.

In an embodiment, the first radio access network is a Packet Switched (PS) network. In an embodiment, the second radio access network is a Circuit Switched (CS) network. In another embodiment, the second radio access network is the CS network and the PS network that supports Dual Transfer Mode (DTM). In another embodiment the second radio access network is a UTRAN network which support both CS and PS simultaneously. In yet another embodiment, the second radio access network is the CS network and PS network that does not supports Dual Transfer Mode (DTM).

In an embodiment, the first radio access network is fourth generation mobile radio communication system. In the embodiment, the first radio access network is an Enhanced Universal Terrestrial Radio Access Network (E-UTRAN) or a UTRAN. In an embodiment, the second radio access network is a third generation mobile radio communication system or a second generation mobile radio communication system. In the embodiment, the second radio access network is a UTRAN or a General Packet Radio Access Service (GPRS) Enhanced Data for GSM Evolution (EDGE) Radio Access Network (RAN) (GERAN).

At step 408, the method identifies a target cell in the second radio access network from the one or more neighboring cells provided by the measurement reports. The target cell is a cell to which the HO procedure is initiated.

At step 410, the method determines the target cell capabilities. In an embodiment, the target cell capabilities are network support capabilities of the target cell. For example, in the environment 100 the target cell capabilities are the capabilities of the target cell 120. Thereafter, at step 412, the method sends at least one of a handover required message and a relocation required message along with the target cell capabilities to a core network element.

In an embodiment, the core network element is a Mobile management Entity (MME). In another embodiment, the core network element is a Serving General Packet Radio Service (GPRS) Support Node (SGSN). In an embodiment, the method also indicates the core network element about a Single Radio Voice Call Continuity handover (SRVCC) operation. The SRVCC is a procedure that is defined in TS 23.216 standards. The SR-VCC operations are used for voice call continuity between Internet Protocol (IP) Multimedia Subsystem (IMS) over PS access network and CS access network for calls that are anchored in IMS. The SRVCC is used when the UE is capable of transmitting/receiving on only one of the access networks at a given time.

In an embodiment, the method 400 further enables core network element to manage voice bearers and non-voice bearers. In an embodiment, the core network element splits the voice bearers and non-voice bearers based on target cell capabilities, a Quality of Service Class Identifier (QCI) associated with the voice bearers and/or SRVCC handover indication. In an embodiment, the QCI notifies the core network element that the bearer belongs to the voice call.

In an embodiment, the method continues HO of the voice bearer from first radio access network to second radio access network based on the target cell capabilities. In an embodiment, the first radio access network is a PS network and the second radio access network is at least a CS network. Hence, in the embodiment, the HO of the voice bearer is initiated from PS network to CS network. Further, the method suspends or deactivates the non-voice bearers based on the target cell capabilities.

For example, when the target cell supports CS network and does not support PS network and Dual Transfer Mode (DTM), then the method deactivates the non-voice bearers. Similarly, when the target cell supports CS network and the PS network but does not support DTM then the method suspends the non-voice bearers. Hence, the suspended non-voice bearer can be resumed when the HO for the voice bearer is completed and User Equipment moves to the target side.

In an embodiment, the HO of the voice bearer and the non-voice bearers is continued from the first radio access network to the second radio access network based on the target cell capabilities. In an embodiment, the first radio access network is a PS network and the second radio access network is a CS network and a PS network.

Hence, in the embodiment, the method initiates Packet Switched (PS) to Circuit Switched (CS) HO for the voice bearers and PS to PS HO for the non-voice bearers. Therefore, the voice bearers that is associated with the PS network in the first radio access network will be associated with the with CS network in the second radio network. Further, the non-voice bearer that is associated with the PS network in the first radio access network is associated with the PS network in the second radio access network. At step 414 the method is terminated.

Figure 5:
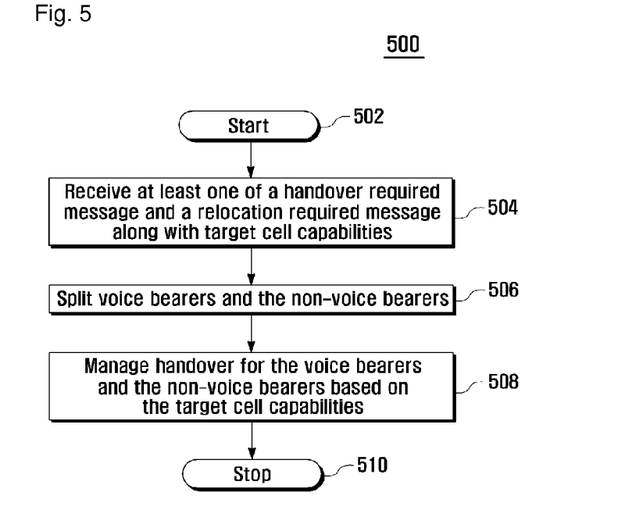
FIG. 5 illustrates a flow chart depicting a method for managing handover from a first radio access network to a second radio access network, in accordance with another embodiment of the present invention.

FIG. 5 illustrates a flow chart depicting a method for managing handover from a first radio access network to a second radio access network, in accordance with another embodiment of the present invention. To explain the method 500, references will be made to FIG. 1. However, it will be apparent to a person ordinarily skilled in the art that the present embodiment can be explained with the help of any other suitable embodiment of the present invention. The method 500 can also include more or fewer number of steps as depicted in FIG. 5. Further, the order of the steps may also vary. In an embodiment, the method is performed by a core network element.

At step 502 the method is initiated. At step 504, the method receives at least one of a handover required message and a relocation required message along with target cell capabilities. In an embodiment, the method is performed at a core network element. Examples of core network element include, but are not limited to, Mobile Management Entity (MME) and a Serving General Packet Radio Service (GPRS) Support Node (SGSN).

In an embodiment, the handover required message or relocation required message along with target cell capabilities is received from the first network element, for example eNodeB in E-UTRAN network 104. At step 506, the method splits voice bearers and the non-voice bearers. In an embodiment, the voice bearers and the non-voice bearers are separated based on a Quality of Service Class Identifier (QCI) associated with the voice bearers and SRVCC handover indication.

In an embodiment, the voice and non voice bearers are extracted from a list of all active bearers (voice and non-voice) associated with the User Equipment along with the target cell capabilities. For example, the core network element, for example the MME 108, receives the list of all the active bearers along with the target cell 120 capabilities from the eNodeB in E-UTRAN 106.

Thereafter, at step 508, the method manages HO for the voice bearers and the non-voice bearers based on the target cell capabilities. In an embodiment, the method continues HO of the voice bearer from the first radio access network to the second radio access network and suspends or deactivates the non-voice bearers based on the target cell capabilities. In another embodiment, the method continues HO of the voice bearers and the non-voice bearers from the first radio access network to the second radio access network based on the target cell capabilities. At step 510 the method is terminated.

Figure 6:
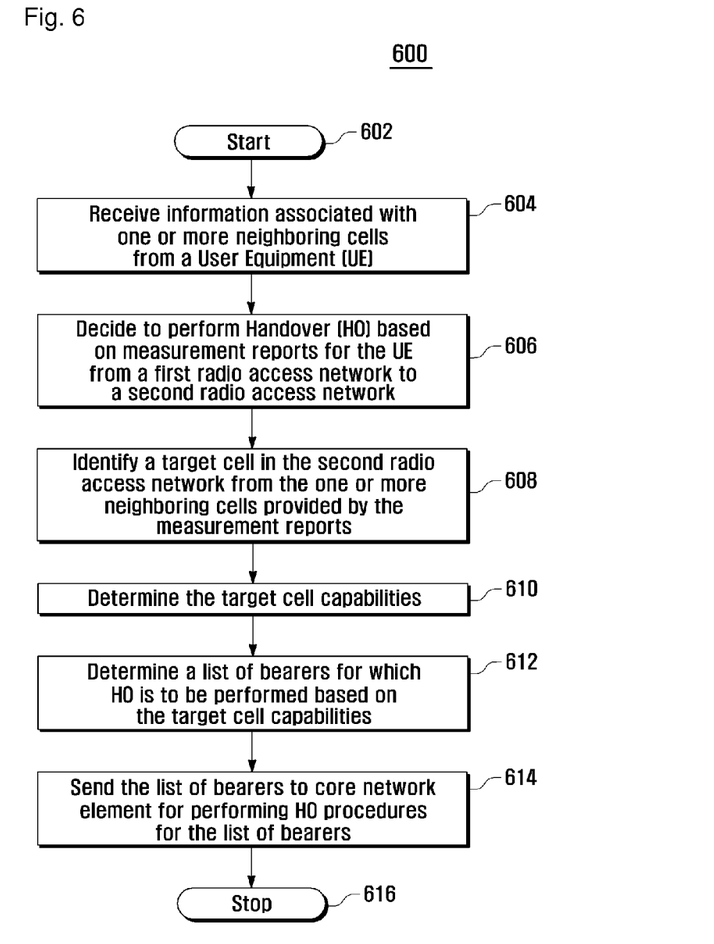
FIG. 6 illustrates a flow chart depicting a method for managing handover from a first radio access network to a second radio access network, in accordance with yet another embodiment of the present invention.

FIG. 6 illustrates a flow chart depicting a method for managing handover from a first radio access network to a second radio access network, in accordance with yet another embodiment of the present invention. To explain the method 600, references will be made to FIG. 1. However, it will be apparent to a person ordinarily skilled in the art that the present embodiment can be explained with the help of any other suitable embodiment of the present invention. The method 600 can also include more or fewer number of steps as depicted in FIG. 6. Further, the order of the steps may also vary. In an embodiment, the method is performed at a first network element. In an embodiment, the method is performed by a first network element of the first radio access network. In an embodiment, the method is performed by eNodeB in the E-UTRAN 106.

At step 602 the method is initiated. At step 604, information associated with one or more neighboring cells is received from a User Equipment (UE). The information associated with the one or more neighboring cell is measurement reports. In an embodiment, the measurement reports include signal strength and resources availability associated with the one or more neighboring cells.

At step 606, the method decides to perform Handover (HO) based on the measurement reports for the User Equipment (UE), for example the UE 102, from the first radio access network to the second radio access network. In an embodiment, the first radio access network is a Packet Switched (PS) network and the second radio access network is at least a Circuit Switched (CS) network.

For example, the first radio access network is an Enhanced Universal Terrestrial Radio Access Network (E-UTRAN) or a UTRAN and the second radio access network is a UTRAN or a General Packet Radio Access Service (GPRS) Enhanced Data for GSM Evolution (EDGE) Radio Access Network (RAN) (GERAN).

At step 608, the method identifies a target cell in the second radio access network from the one or more neighboring cells provided by the measurement reports. The target cell is a cell to which the HO procedure is intimated. At step 610, the method determines the target cell capabilities. In an embodiment, the target cell capabilities are the network support capabilities of the target cell.

At step 612, a list of bearers for which HO is to be performed is determined based on the target cell capabilities. At step 614, the list of bearers is sent to a core network element for performing HO procedures for the list of bearers. For example, the list of bearers is sent by the eNodeB to a Mobile management Entity (MME) or a Serving General Packet Radio Service (GPRS) Support Node (SGSN), for example the MME 108 or the SGSN 114.

In an embodiment, the list of bearers includes only a list of voice bearers based on the target cell capabilities. In the embodiment, the method suspends or deactivates the non-voice bearers based on the target cell capabilities. In an embodiment, the list of bearers includes a combined list of voice bearers and non-voice bearers based on the target cell capabilities.

For example, when the target cell supports CS network and does not support PS network and Dual Transfer Mode (DTM), then the method deactivates the non-voice bearers and sends only a list of voice bearers. Similarly, when the target cell supports CS network and the PS network but does not support DTM then the method suspends the non-voice bearers and sends a list of voice bearers and suspends the non-voice bearers for a predetermined interval of time. Hence, the suspended non-voice bearers can be resumed when the HO for the voice bearer is completed. In another example, when the target cell is a CS network and a PS network and also supports DTM then a list of voice bearer and non-voice bearers is sent to the core network element. At step 616, the method is terminated.

Figure 7:
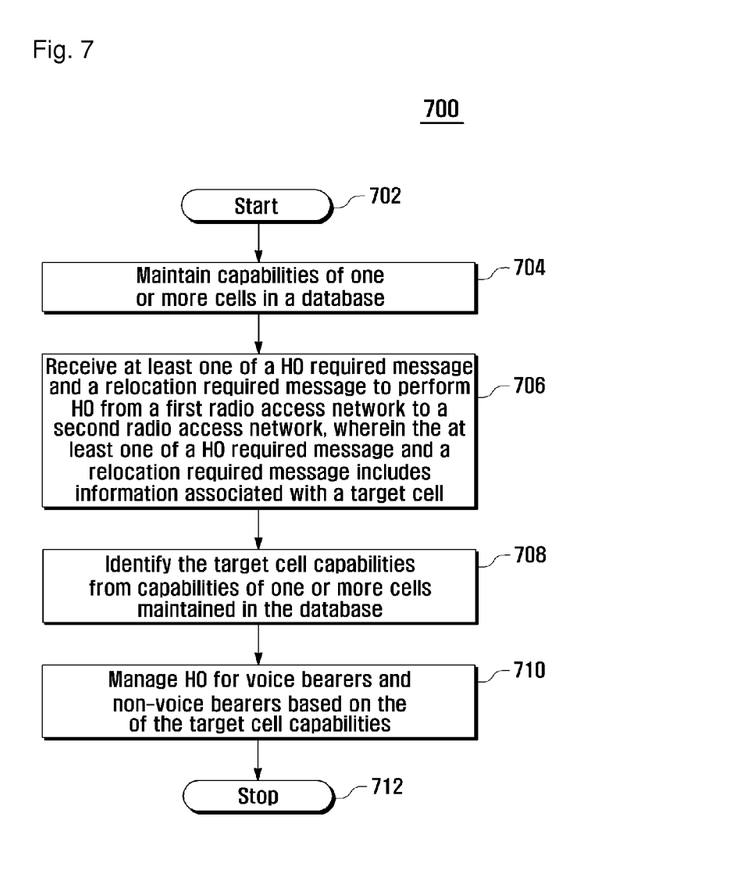
FIG. 7 illustrates a flow chart depicting a method for managing handover from a first radio access network to a second radio access network, in accordance with still another embodiment of the present invention.

FIG. 7 illustrates a flow chart depicting a method for managing handover from a first radio access network to a second radio access network, in accordance with still another embodiment of the present invention. To explain the method 700, references will be made to FIG. 1. However, it will be apparent to a person ordinarily skilled in the art that the present embodiment can be explained with the help of any other suitable embodiment of the present invention. The method 700 can also include more or fewer number of steps as depicted in FIG. 7. Further, the order of the steps may also vary. In an embodiment, the method is performed at a core network element.

At step 702 the method 700 is initiated. At step 704, the method 700 maintains capabilities of one or more cells in a database. In an embodiment, capabilities of the one or more cells are stored in the memory. In an embodiment, the memory is configured in the core network element. In another embodiment, the memory is externally associated with the core network element. In the environment 100, the database in the memory is associated in the Home Subscriber Server (HSS) 122.

At step 706, the method receives at least one of a handover required message and a relocation required message along with information associated with a target cell to perform HO from the first radio access network to the second radio access network. At step 708, the target cell capabilities are identified from the capabilities of the one or more cells stored in the database. For example, after receiving target cell information, the method matches the target cell with the one or more cells registered in the database. Further, the method identifies the capabilities maintained in the database associated with a cell that is matched with the target cell.

Thereafter, at step 710, the method manages HO for the voice bearers and the non-voice bearers based on the target cell capabilities stored in the database. At step 712, the method 700 is terminated.

Figure 8:
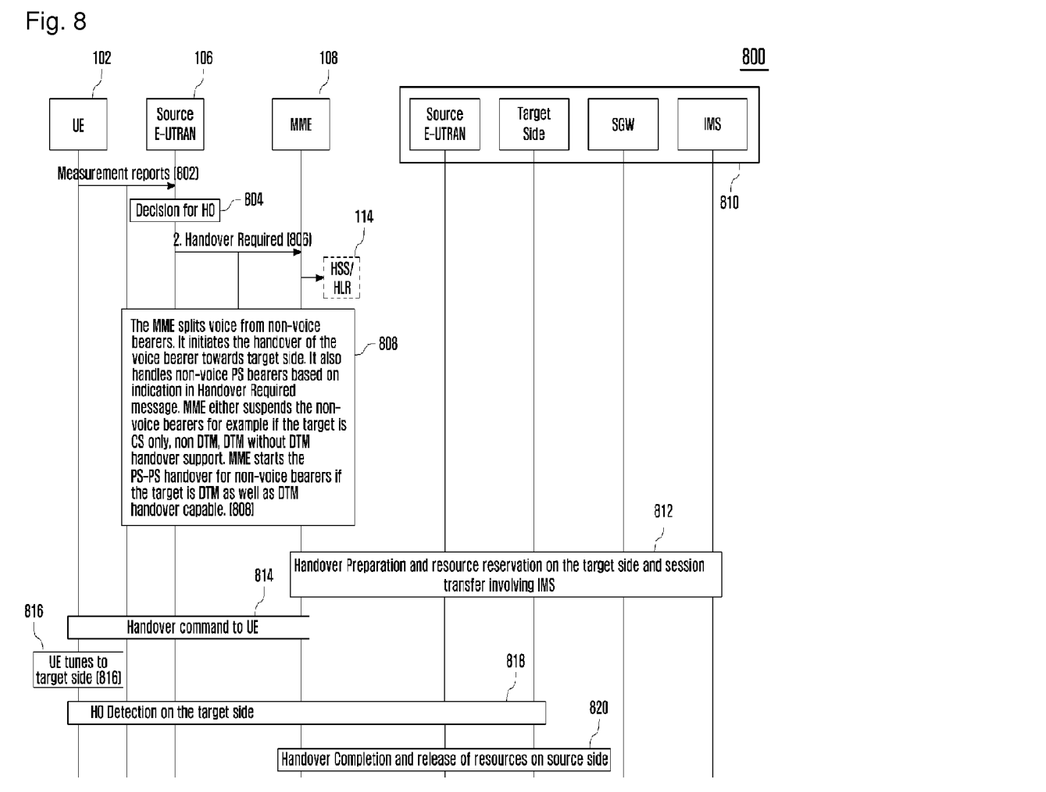
FIG. 8 illustrates a flow diagram depicting a method for managing handover from a first radio access network to a second radio access network, in accordance with an embodiment of the present invention.

FIG. 8 illustrates a flow diagram depicting a method for managing handover from a first radio access network to a second radio access network, in accordance with an embodiment of the present invention. To explain the method 800, references will be made to FIG. 1. However, it will be apparent to a person ordinarily skilled in the art that the present embodiment can be explained with the help of any other suitable embodiment of the present invention.

In the environment 100, the UE 102 periodically determines measurement reports of one or more neighboring cells. At step 802, the UE 102 sends the measurement reports to the Source E-UTRAN 106. At step 804, the method at E-UTRAN 106 decides for a HO. Then the source E-UTRAN 106 identifies a target cell in the second radio access network 120 to which the HO is performed provided by the measurement reports received from UE 102. The E-UTRAN also identifies the target cell capabilities. At step 806 at least one of a handover required message and a relocation required message along with the target cell capabilities is sent to the Source MME 108.

At step 808, the MME 108 manages voice bearers and the non-voice bearers. In an embodiment, the core network element splits the voice bearers and the non-voice bearers based on target cell capabilities, a Quality of Service Class Identifier (QCI) associated with the voice bearers and/or SRVCC handover indication. In an embodiment, the method continues HO of the voice bearer from source radio access network E-UTRAN 106 to a second radio access network 810 based on the target cell capabilities. In an embodiment, the source radio access network is a PS network and the target radio access network is only a CS network. Hence, in the embodiment, the HO of the voice bearer is initiated from Packet Switched (PS) network to Circuit Switched (CS) network.

In another embodiment, the non-voice bearers are suspended or deactivated based on the target cell capabilities. For example, when the target cell supports CS network and does not support PS network and Dual Transfer Mode (DTM), then the method deactivates the non-voice bearers. Similarly, when the target cell supports CS network and the PS network but does not support DTM then the method suspends the non-voice bearers. Hence, the suspended non-voice bearers can be resumed when the HO for the voice bearer is completed and User equipment moves to target side.

In an embodiment, the HO of the voice bearer and the non-voice bearers is continued from the source radio access network 104 to the second radio access network 810 based on the target cell capabilities. In an embodiment, the first radio access network is a PS network and the second radio access network is a CS network and a PS network. Hence, in the embodiment, the method initiates Packet Switched (PS) to Circuit Switched (CS) HO for the voice bearers and Packet Switched (PS) to Packet Switched (PS) HO for the non-voice bearers.

At step 812, the HO preparation and resource reservation is performed. Further session transfer preparation involving IMS is also performed. At step 814, the MME 108 sends the HO command to the UE 102. For example, when session transfer is initiated and the handover preparation is complete in the target cell, the MME 108 sends a HO command to the UE 102. At step 816, the method tunes the target cell after receiving the message from MME. Hence, the UE 102 on receiving the HO command moves to target cell side. At step 818 the target side detects presence of the UE 102. Further, at step 820 the target side informs the MME 108 of handover completion. Thereafter, the MME 108 releases resources reserved for the UE 102 on the source cell 104.

Various embodiments of the present invention described above provide the following advantages. The present invention provides a method for managing Handover (HO) in plurality of radio access networks. The present invention enables a user to move from one radio access network to another radio access network during an in-progress call without interruption. Further, the method has no impact on the existing radio access network and thus it can be implemented without changing the existing radio access network systems.

The method also minimizes the handover preparation phase. In addition, HO from a higher generation communication network, for example the fourth generation radio access network to the lower generation radio access network, for example third generation radio access network is carried out easily without any impact on a Quality of Service.

Further, the method provides efficient compatibility during HO from a radio access network supporting only Packet Switched (PS) network to another radio access network supporting Circuit Switched (CS) and/or PS. Further, during the HO process, the method effectively manages voice bearers and non-voice bearers. The method in-advance identifies a list of bearers that can be managed by the target cell. Hence, the overall overhead of HO process is reduced effectively and this increases efficiency of the radio access networks.

The method avoids unnecessary signaling as a core network element (for example MME or SGSN) is updated with sufficient information about the target cell capabilities. Hence the core network element can take correct decision associated with handling of non-voice bearers.

While the embodiments of the present invention have been illustrated and described, it will be clear that the present invention and its advantages are not limited to these embodiments only. Numerous modifications, changes, variations, substitutions and equivalents will be apparent to those skilled in the art without departing from the spirit and scope of the present invention as described in the claims.

The invention claimed is:

1. A method for managing handover (HO) from a first radio access network to a second radio access network, the method performed at a first network entity of the first radio access network, the method comprising:
   receiving a measurement report from a user equipment (UE);
   determining to trigger the HO for the UE from the first radio access network to the second radio access network, based on the measurement report;
   transmitting a handover required message including first information indicating whether the HO is for only a circuit switched (CS) network or both a CS network and a packet switched (PS) network, based on the determining; and
   initiating a PS to CS HO for a voice bearer,
   wherein the first information is used, by a first core network entity, to separate the voice bearer from a non-voice bearer,
   wherein a HO for the non-voice bearer is suspended, if the second radio access network does not support a dual transfer mode (DTM),
   wherein the suspended non-voice bearer is resumed, if a call corresponding to the voice bearer is terminated and if the UE is in the second radio access network, and
   wherein second information associated with the resuming of the suspended non-voice bearer is transmitted to a second core network entity, and
   wherein the voice bearer and the non-voice bearer are associated with the PS network in the first radio access network and the voice bearer is associated with the CS network in the second radio access network and the non-voice bearer is associated with the PS network in the second radio access network.

2. The method claim 1, wherein the first radio access network comprises at least a PS network, and
   wherein the second radio access network comprises at least a CS network.

3. The method of claim 1, wherein the first network entity of the first radio access network comprises at least one of an eNodeB, a NodeB and a radio network controller (RNC).

4. A method for managing handover (HO) from a first radio access network to a second radio access network of a user equipment (UE), performed at a first core network entity, the method comprising:
   receiving at least one of a handover required message and a relocation required message comprising first information indicating whether the HO is for only a circuit switched (CS) network or both a CS network and a packet switched (PS) network;
   splitting a voice bearer from a non-voice bearer based on the first information;
   initiating a PS to CS HO for a voice bearer, and
   managing HO for the voice bearer and the non-voice bearer,
   wherein a HO for the non-voice bearer is suspended, if the second radio access network does not support a dual transfer mode (DTM),
   wherein the suspended non-voice bearer is resumed, if a call corresponding to the voice bearer is terminated and if the UE is in the second radio access network,
   wherein second information associated with the resuming of the suspended non-voice bearer is transmitted to a second core network entity, and
   wherein the voice bearer and the non-voice bearer are associated with the PS network in the first radio access network and the voice bearer is associated with the CS network in the second radio access network and the non-voice bearer is associated with the PS network in the second radio access network.

5. The method of claim 4, further comprising continuing the HO of the voice bearer from the first radio access network to the second radio access network and at least one of suspending and deactivating the non-voice bearer based on the information.

6. The method of claim 4, wherein the first core network entity comprises at least one of a mobile management entity (MME) and a serving general packet radio service (GPRS) support node (SGSN).

7. A first network entity of a first radio access network comprising:
   a processor for determining to trigger a handover (HO) based on a measurement report for a user equipment (UE) from the first radio access network to a second radio access network
   and initiating a packet switched (PS) to circuit switched (CS) HO for a voice bearer; and
   a transceiver for receiving the measurement report from the UE and transmitting at least one of a handover required message and a relocation required message, comprising first information indicating whether the HO is for only a CS network or both the CS network and a (PS) network, based on the determining,
   wherein the first information is used, by a first core network entity, to separate the voice bearer from a non-voice bearer,
   wherein a HO for the non-voice bearer is suspended, if the second radio access network does not support a dual transfer mode (DTM),
   wherein the suspended non-voice bearer is resumed, if a call corresponding to the voice bearer is terminated and if the UE is in the second radio access network, and
   wherein second information associated with the resuming of the suspended non-voice bearer is transmitted to a second core network entity, and
   wherein the voice bearer and the non-voice bearer are associated with the PS network in the first radio access network and the voice bearer are associated with CS network in the second radio access network and the non-voice bearer are associated with the PS network in the second radio access network.

8. The first network entity of claim 7, wherein the first radio access network comprises at least a PS network, and wherein the second radio access network comprises at least a CS network.

9. The first network entity of claim 7, wherein the first network entity of the first radio access network comprises at least one of an eNodeB, a NodeB and a radio network controller (RNC).

10. A first core network entity comprising:
    a transceiver for receiving at least one of a handover required message and a relocation required message, comprising first information indicating whether a handover (HO) of a user equipment (UE) is for only a circuit switched (CS) network or both a CS network and a Packet Switched (PS) network; and
    a processor for splitting a voice bearer from a non-voice bearer based on the first information, initiating a PS to CS HO for the voice bearer and managing the HO for the voice bearer and the non-voice bearer,
    wherein a HO for the non-voice bearer is suspended, if the second radio access network does not support a dual transfer mode (DTM),
    wherein the suspended non-voice bearer is resumed, if a call corresponding to the voice bearer is terminated and if the UE is in the second radio access network,
    wherein second information associated with the resuming of the suspended non-voice bearer is transmitted to a second core network entity, and
    wherein the voice bearer and the non-voice bearer are associated with the PS network in the first radio access network and the voice bearer are associated with CS network in the second radio access network and the non-voice bearer are associated with the PS network in the second radio access network.

11. The first core network entity of claim 10, wherein the processor continues HO of the voice bearer from the first radio access network to the second radio access network and at least one of suspending and deactivating the non-voice bearer based on the information.

12. The first core network entity of claim 10, wherein the first core network entity comprises at least one of a mobile management entity (MME) and a serving general packet radio service (GPRS) support node (SGSN).

13. A method for managing handover (HO) from a first radio access network to a second radio access network, the method comprising:
    receiving, by a first network entity of the first radio access network, a measurement report from a user equipment (UE);
    determining, by the first network entity, to trigger a HO based on the measurement report for the UE from the first radio access network to the second radio access network;
    initiating, by the first core network entity, a packet switched (PS) to circuit switched (CS) HO for a voice bearer
    generating, by the first network entity, first information indicating whether the HO is for only a (CS) network or both the CS network and a (PS) network;
    transmitting at least one of a handover required message and a relocation required message comprising the first information to a first core network entity;
    splitting, by the first core network entity of the second radio access network, the voice bearer from a non-voice bearer based on the first information; and
    managing, by the first core network entity, HO for the voice bearer and the non-voice bearer,
    wherein a HO for the non-voice bearer is suspended, if the second radio access network does not support a dual transfer mode (DTM),
    wherein the suspended non-voice bearer is resumed, if a call corresponding to the voice bearer is terminated and if the UE is in the second radio access network,
    wherein second information associated with the resuming of the suspended non-voice bearer is transmitted to a second core network entity, and
    wherein the voice bearer and the non-voice bearer are associated with the PS network in the first radio access network and the voice bearer is associated with the CS network in the second radio access network and non-voice bearer is associated with the PS network in the second radio access network.

14. The method of claim 13, further comprising continuing by the first core network entity, HO of the voice bearer from the first radio access network to the second radio access network and at least one of suspending and deactivating the non-voice bearer.

15. A network for managing handover (HO) from a first radio access network to a second radio access network, the network comprising:
    a first network entity for receiving a measurement report from a user equipment (UE), determining to trigger a HO based on the measurement report for the UE from the first radio access network to the second radio access network, initiating a packet switched (PS) to circuit switched (CS) HO for a voice bearer generating first information indicating whether the HO is for only a (CS) network or both the CS network and a (PS) network, based on the determining, and transmitting at least one of a handover required message and a relocation required message comprising the first information to a first core network entity; and the first core network entity for receiving at least one of the handover required message and the relocation required message comprising the first information, splitting the voice bearer from a non-voice bearer based on the first information, and managing the HO for the voice bearer and the non-voice bearer, wherein a HO for the non-voice bearer is suspended, if the second radio access network does not support a dual transfer mode (DTM), wherein the suspended non-voice bearer is resumed, if a call corresponding to the voice bearer is terminated and if the UE is in the second radio access network, wherein second information associated with the resuming of the suspended non-voice bearer is transmitted to a second core network entity, and wherein the voice bearer and the non-voice bearer are associated with the PS network in the first radio access network and the voice bearer is associated with the CS network in the second radio access network and the non-voice bearer is associated with the PS network in the second radio access network.

16. The network of claim 15, wherein the first core network entity continues HO of the voice bearer from the first radio access network to the second radio access network and at least one of suspending and deactivating the non-voice bearer based on the information.

* * * * *